H. R. EVANS.
SOAP DISPENSING MACHINE.
APPLICATION FILED JUNE 28, 1910.
1,130,672.
Patented Mar. 2, 1915.
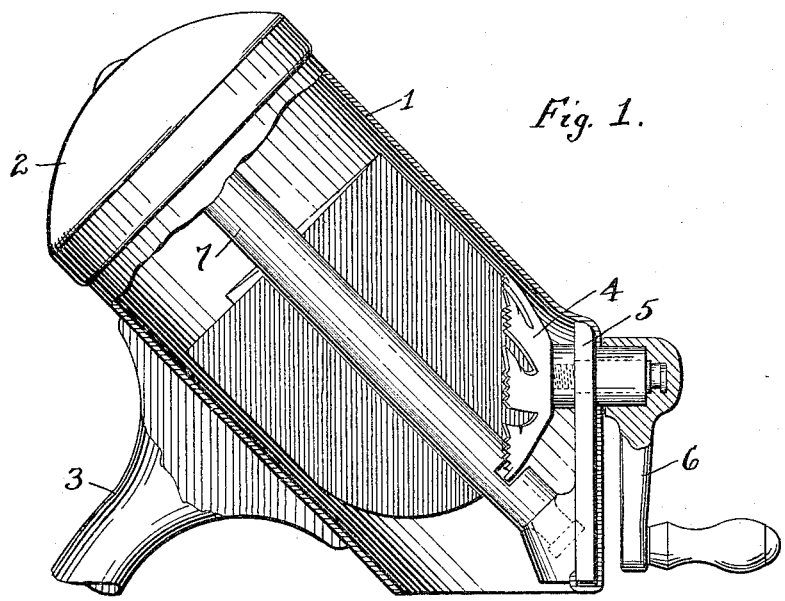
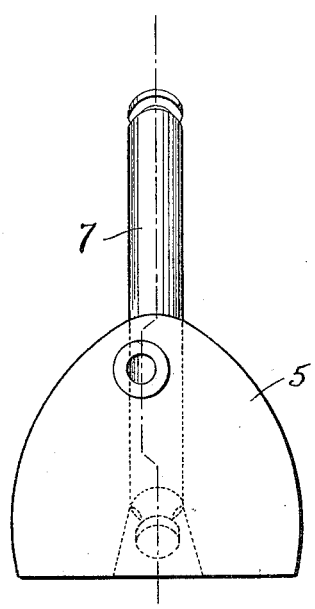
Fig. 2.
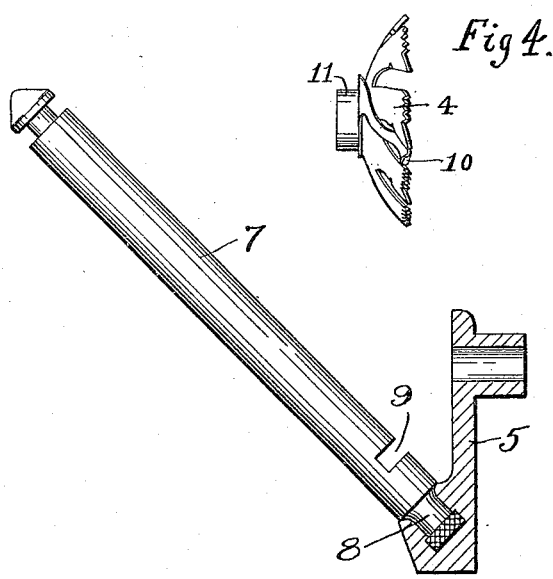
Fig. 3.
WITNESSES:
BW Could...
Benj H Lewis.
Henry R. Evans, INVENTOR.
BY Lewis J. Doolittle
ATTORNEY.

UNITED STATES PATENT OFFICE.

HENRY R. EVANS, OF NEW YORK, N. Y., ASSIGNOR TO GRANULATOR SOAP COMPANY, A CORPORATION OF NEW YORK.

SOAP-DISPENSING MACHINE.

1,130,672.  Specification of Letters Patent.  Patented Mar. 2, 1915.

Application filed June 28, 1910. Serial No. 569,290.

*To all whom it may concern:*

Be it known that I, HENRY R. EVANS, a citizen of the United States, and resident of the city, county, and State of New York, have invented certain new and useful Improvements in Soap-Dispensing Machines, of which the following is a specification.

This invention relates to soap dispensing machines and has for its object the provision of a machine of simplified construction and increased efficiency for comminuting soap from a cake in small particles which produce a lather readily and freely in the hand.

In carrying out the invention a container or receptacle is provided of suitable form to receive a cake of soap. This container is mounted in an angular position so that gravity tends to cause the cake of soap to be fed toward the cutter which is positioned in the lower portion thereof. In order to provide for the operation of the cutter over the entire lower surface of the cake the same are mounted with a peculiar relationship to each other, which will be more fully explained hereinafter, and by reason of this arrangement the operation of the cutter also assists in the feeding of the cake thereto.

The subject-matter of this application is directed more particularly to the means provided for establishing and maintaining the positive relationship of the cutter and cake of soap and to the cutter construction.

In the drawings in this application the invention is shown as embodied in a machine of the type indicated.

Similar parts in the several views have been given the same reference numerals.

Figure 1 is a side elevation, partially in section, of a soap dispensing machine, the supporting bracket being broken away. Fig. 2 is a detail front view of the cutter support. Fig. 3 is a side elevation, partially in section, of Fig. 2. Fig. 4 is a side elevation, showing a modification of cutter construction.

A container or soap receptacle is shown at 1. This container may be of any suitable form but is preferably cylindrical in shape and provided with a removable cover 2. A suitable bracket 3 is attached to the container 1, by means of which the same may be secured to the wall or basin in the angular position shown.

A cutter 4, which is preferably of dish form, is rotatably mounted in the lower portion of the container 1 upon a cutter support 5. A suitable handle 6 is provided for rotating the cutter 4 from the exterior of the container 1.

A spindle 7 upon which the cake or cakes of soap may be positioned is attached to the cutter support 5. A simple and effective method of attaching this spindle 7 is shown in Fig. 3. The cutter support 5 may be conveniently constructed of cast metal and the spindle 7 being provided with a necked-down end portion 8 may be cast therein, as shown, thus securing a solid fastening and insuring a fixed relationship between the spindle 7 and the cutter 4, which is mounted upon a shaft extending through the bearing provided in the cutter support 5, in the manner shown in Fig. 1.

The lower end of the container 1 is formed to secure the cutter support 5 so that when the same is positioned therein in the manner shown in Fig. 1 the axes of the cutter and spindle will be maintained in the same relative position regardless of any yielding or bending of the thin shell of the container 1, due to the strain in operating the device or otherwise.

The cake of soap is preferably cylindrical in form and provided with a central opening which permits the same to be positioned upon the spindle 7 so as to be freely rotatable. As shown in Fig. 2, the axis of the cutter is slightly offset from the axis of the spindle 7 and the cutter engages the soap on one side only of the axis of the spindle. As the same is turned the cutting edges advance successively and progressing over the lower surface of the cake, cutting, therefrom small particles of soap and also causing the cake to rotate about the spindle 7. This rotation of the soap cake is due to the peculiar relationship of the spindle and cutter and results in the entire lower end of the cake being operated upon continuously as long as the cutter is rotated. The slot 9 in the spindle 7 permits the periphery of the cutter to extend to the axis about which the cake of soap is rotated. A portion of the cutter is constantly bearing downwardly upon the cake of soap and thus assists gravity in feeding the same toward the cutter.

In Fig. 4 an additional feature is provided in the cutter construction in the form of a resilient finger 10 which extends through one of the slots in the cutter 4 slightly beyond the inner face of the same and is secured to the cutter and its hub 11 so as to rotate therewith. The purpose of this finger 10 is to insure the turning of the soap cake when the same becomes so small by being cut away that the engaging effect of the cutting edges is much lessened by reason of the reduced weight of the cake and, consequently decreasing the pressure of the same against the cutter. It will be obvious that it is important to continually rotate the cake during the process of cutting in order to insure a continuous and progressive cutting over the entire lower surface thereof and, while the insertion of a new cake on top of the old cake when partially cut away would insure this operation, it has been found desirable to provide this additional means for insuring the continuous rotation should the operator neglect to place a fresh cake in the machine when the old cake has become nearly cut away.

The most efficient results in a machine of this type can only be obtained when the cutter and cake of soap are maintained in an exact relationship to each other and as the container is preferably and usually a shell made of light material it is not in itself substantial enough to maintain this exact relationship of the parts when the same are secured independently thereto. A further result accomplished by the construction just described is the facility with which the operating parts of the machine may be assembled with greater exactness and then placed as a whole in the container.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:

1. In a soap dispensing machine, in combination, a container, a cutter, a support for said cutter, said support comprising a separate member mounted in said container, a stationary spindle attached to said support and adapted to receive a cake of soap in position to be rotated when operated upon by said cutter and to maintain said cake of soap and cutter in a positive relationship to each other.

2. In a soap dispensing machine, in combination, a container, a rotary cutter, and a stationary support comprising a separate member mounted in said container and having a bearing in which said cutter is rotated and also having a stationary spindle positioned at an angle with the axis of said cutter adapted to receive a cake of soap and permit the same to be engaged by said cutter on one side only of said spindle whereby when said cutter is rotated the cake of soap is rotated.

3. In a soap dispensing machine, in combination, a container, a rotary cutter, a spindle adapted to receive a cake of soap and maintain the same in position to be operated upon by said cutter, and a support comprising a separate member mounted in said container and upon which said cutter is rotatively mounted and to which said spindle is attached, thereby maintaining the same in an exact relationship to each other.

4. In a soap dispensing machine, in combination, a container, a rotary cutter, a stationary spindle adapted to receive a cake of soap and maintain the same in position to be operated upon by said cutter, and a support comprising a separate member mounted in said container and upon which said cutter is rotatively mounted and to which said spindle is rigidly attached, thereby maintaining the same in an exact relationship to each other.

5. In combination with a soap dispensing machine, a receptacle for a cake of soap, a cutter for comminuting said cake of soap, and a finger operative in conjunction with said cutter to engage said cake of soap and to move the same to cause a progressive operation of said cutter thereupon.

6. In combination with a soap dispensing machine, a receptacle for a cake of soap, a cutter for comminuting said cake of soap, and a resilient finger operative in conjunction with said cutter to engage said cake of soap and to move the same to cause a progressive operation of said cutter thereupon.

7. In combination with a soap dispensing machine, a receptacle for a cake of soap, a cutter having a number of slots each provided with a cutting edge adapted to sever small particles from said cake of soap, and a resilient finger extending through one of said slots in said cutter and adapted to engage said cake of soap and to move the same to cause a progressive operation of said cutter thereupon.

8. In combination with a soap dispensing machine, a receptacle for a cake of soap, a cutter having a number of slots each provided with a cutting edge adapted to sever small particles from said cake of soap, and a resilient finger attached to said cutter and adapted to engage said cake of soap and to move the same to cause a progressive operation of said cutter thereupon.

9. In combination with a soap dispensing machine, a receptacle for rotatively supporting a cake of soap, a rotary cutter engaging a portion of a cake of soap positioned in said machine, and an engaging member adapted to rotate said cake of soap and to cause a progressive operation of said cutter thereupon.

10. In combination with a soap dispensing machine, a receptacle for rotatively supporting a cake of soap, a rotary cutter engaging a portion of a cake of soap positioned in said machine, and an engaging member operated simultaneously and coöperatively with said cutter and adapted to rotate said cake of soap and to cause a progressive operation of said cutter thereupon.

Signed at New York, county and State of New York, this 23rd day of June, 1910.

HENRY R. EVANS.

Witnesses:
HORACE W. SIMMS,
CHARLES P. BERRETON.

Copies of this patent may be obtained for five cents each, by addressing the "Commissioner of Patents, Washington, D. C."